May 1, 1956 W. T. ROSSELL 2,743,681
LATERAL MOTION DAMPING DEVICE
Filed Jan. 4, 1952 2 Sheets-Sheet 1
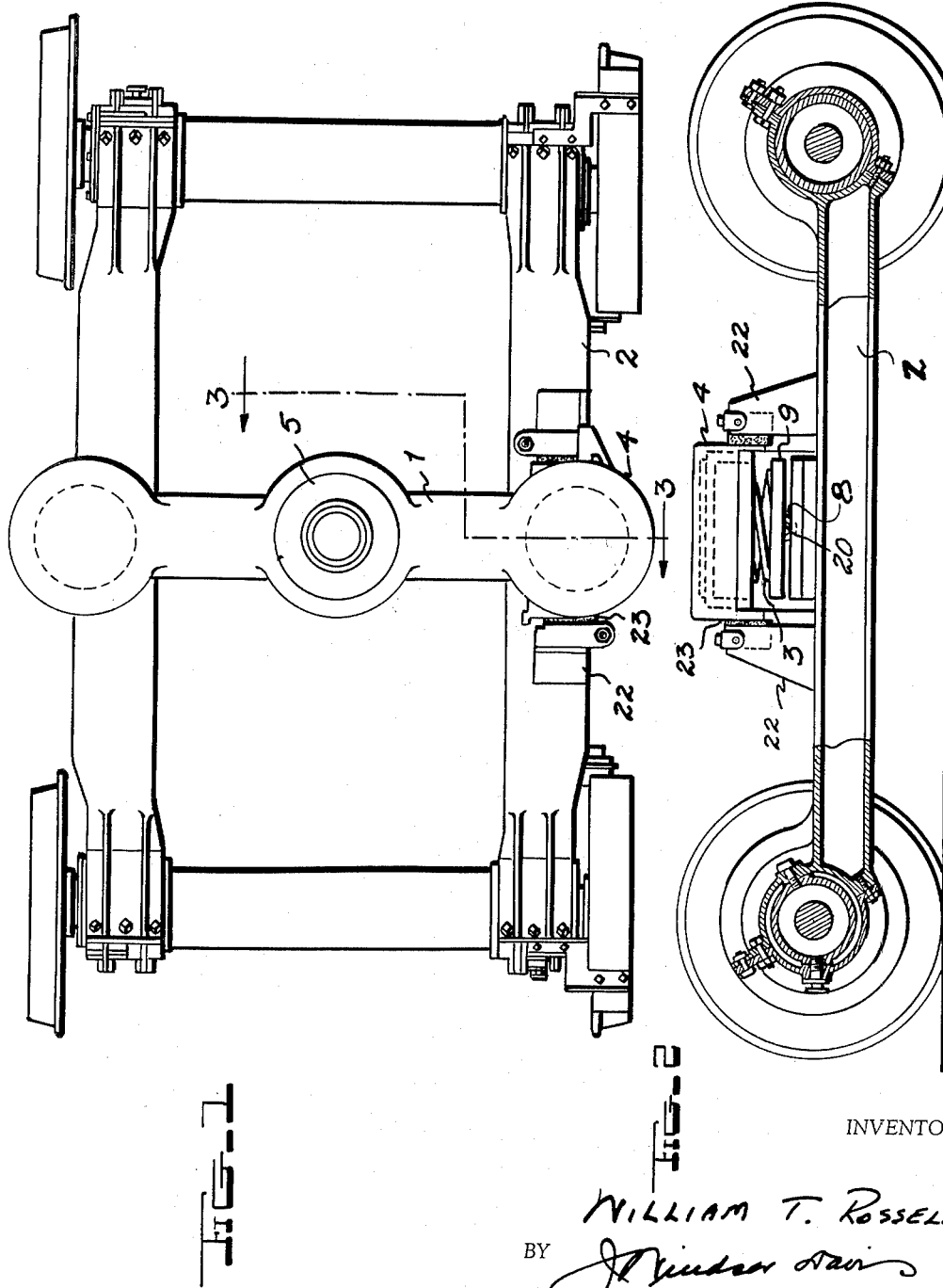
INVENTOR
WILLIAM T. ROSSELL
BY
ATTORNEY May 1, 1956 W. T. ROSSELL 2,743,681
LATERAL MOTION DAMPING DEVICE
Filed Jan. 4, 1952 2 Sheets-Sheet 2
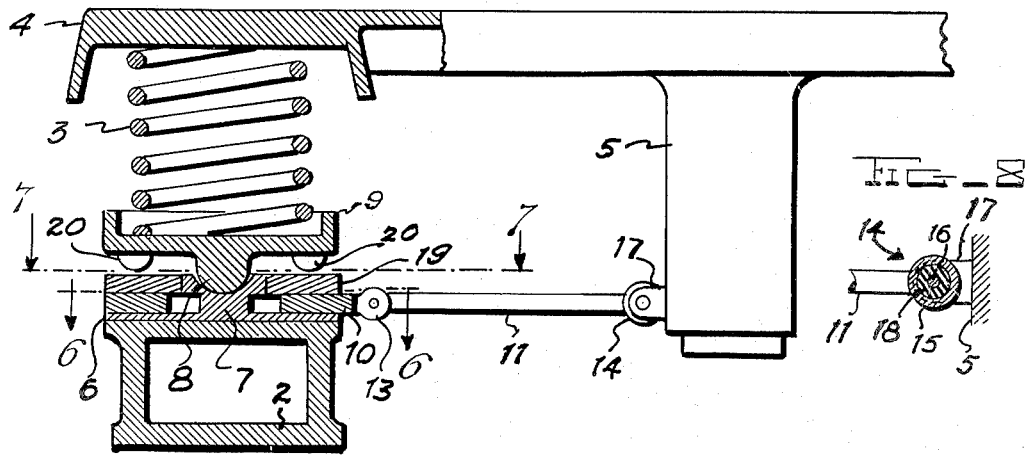
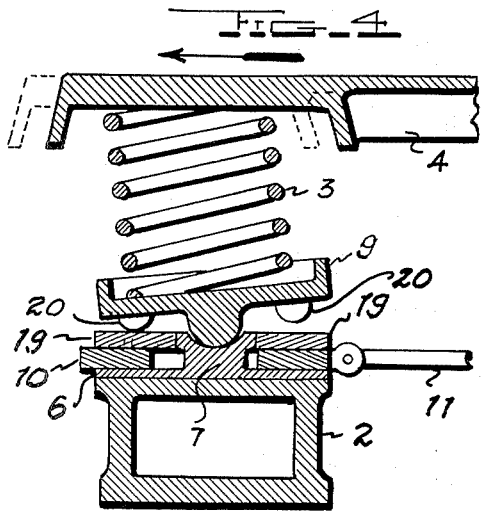
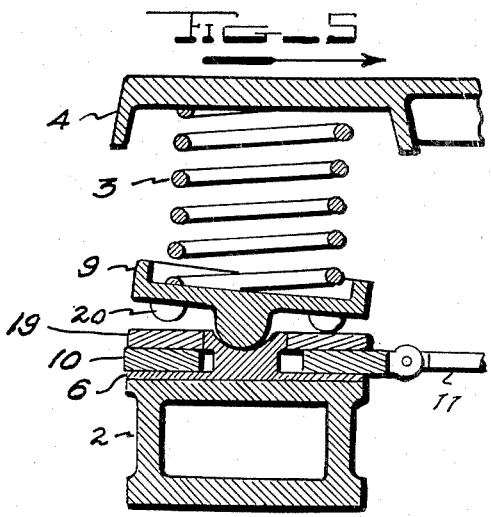
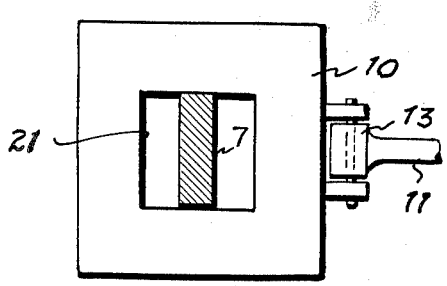
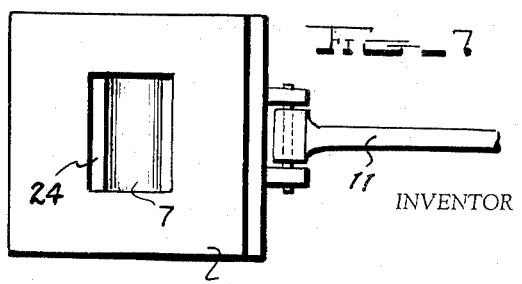
INVENTOR
BY WILLIAM T. ROSSELL
ATTORNEY

United States Patent Office 2,743,681
Patented May 1, 1956

2,743,681

LATERAL MOTION DAMPING DEVICE

William T. Rossell, New York, N. Y., assignor to Transit Research Corporation, New York, N. Y., a corporation of New York Application January 4, 1952, Serial No. 265,035

5 Claims. (Cl. 105—193)

This invention relates to motion damping means for vehicles and has for its object to provide improved means for controlling the lateral oscillations of a vehicle body in accordance with the lateral forces acting to displace it and also in accordance with the amount of loading imposed by the body.

This invention has particular applicability to rail cars wherein the swinging motions of the bolster are to be controlled but it may also be applied to certain types of bus body mountings, to some automotive trucks and to other types of vehicles where it is important to riding quality to damp the lateral movement of the body relative to an axle.

A rail truck of the type herein illustrated has a bolster supported at each end by a spring. The supporting springs act at the main truck springs and hence act both laterally and vertically. Since the requirements as to spring rate for lateral movements may not be possible of attainment with springs which properly provide vertical springing, it becomes necessary to employ motion damping means. Further, springs may be expected to alter their spring rate laterally in response to increased vertical deflection so that a motion damping device which provides constant friction regardless of car body loading or deflection of the springs, will impart an ideal damping at only one degree of loading. It is therefore the principal object of this invention to provide a motion damping device which acts in proportion to a given static loading and which increases its resistance to lateral motions of the bolster in proportion to the increase of loading on the supporting springs, as well as in proportion to the extent of lateral swinging movement. The type of spring used is also a factor since a rubber shear spring, for instance, would offer a resistance different from a leaf spring and a leaf spring would offer a resistance different from that of a coil spring. The formula of the resistance offered to the lateral movements of the body according to this invention may therefore be expressed as the product of the vertical dislocation related to the mass by the lateral dislocation by a factor indicative of the vertical spring rate.

Another object is to provide means for modifying the above requirements for setting up friction in such manner that the friction device will not become operative for snubbing until the bolster or body has moved a predetermined distance laterally from its normal centered position. The body will, therefore, not be subject to many short wave vibrations which would otherwise be transmitted thereto.

The description is applied to a device associated with the main bolster springs but, obviously, it may be applied to springs other than the main springs.

Other objects and advantages will become hereinafter more fully apparent as reference is had to the accompanying drawings wherein the invention is illustrated, by way of example, as being applied to a rail truck and in which Figure 1 shows a top plan view of a rail truck with my invention applied thereto, Figure 2 shows a side elevation of the truck of Figure 1, Figure 3 shows a vertical section through the bolster and side frame with the center pin shown in elevation, the bolster being in normally centered position, the view being taken along the line 3—3 of Figure 1, Figure 4 is a view similar to Figure 3 except that the bolster is shown after some but not maximum swinging movement to the left, Figure 5 is a view similar to Figure 3 showing the bolster after some but not maximum swinging movement to the right, Figure 6 is a horizontal section taken along the line 6—6 of Figure 3 showing the movable friction plate in elevation, Figure 7 is a horizontal section taken along the line 7—7 of Figure 3 showing the other friction plate in elevation, the spring cap supporting rocker being removed, and Figure 8 is a detail view showing a diametric section through the link end which connects an element of the friction device to the bolster.

More particularly, the numeral 1 refers to a load imposing member and 2 refers to a load receiving member separated by a spring 3. The member 1 may be any member subject to loading and to variable loading such as the body of a vehicle or the bolster of a rail truck, as is particularly illustrated, and the member 2 represents any load receiving member such as an axle housing or rail truck frame, as herein illustrated. The spring 3 may be of leaf, rubber or coil construction, the coil type being illustrated. The invention to be hereinafter described is equally applicable to different types of load imposing and load receiving assemblies but will be described only with respect to the rail truck, as illustrated.

The bolster 1 has a spring receiving cap 4 at each end thereof and a center bearing pot 5 intermediate the ends thereof to receive a car body. On top of the side rail of the main frame 2 I provide a wear plate 6 which is welded or otherwise fixedly secured to the frame 2 and which has a spring cap seat 7 arising therefrom to receive a rocker 8 formed on the exterior surface of the spring cap 9 which receives the spring 3.

The wear plate 6 constitutes a friction element upon which a second element or plate 10 rests in surface contact therewith. A link 11 is pivotally connected at one end 13 to the plate 10 and to the center pot 5 at its other end 14. Either one or both of the pivotal connections may contain a resilient element, the right one 14 of these connections being illustrated in vertical section in Figure 8.

This connection 14 is formed by a cylindrical end 15 on the link 11, a pin 16 carried by a bracket 17 on the center pot and a cylinder of rubber 18 separating the pin 16 and the cylindrical end 15. This connection prevents shock when the link is moved while heavy pressure exists between the friction elements.

Resting on top of the plate 10 is a third friction element 19. As best shown in Figures 3 and 7 this element 19 has a central opening 24 of the approximate size of the exterior of the spring cap support 7. The seat or support 7 thus prevents horizontal movement of the plate 19 with respect thereto and hence holds it in place during movements of the element 10. The plate 10 has a central opening 21, as best seen in Figures 3 and 6, substantially larger than the shank of the seat 7 which it surrounds, in order that it may be able to move relative thereto.

The spring cap 9 has the main supporting rocker 8 depending from the bottom thereof, as described, and also two additional projections or stops 20 at diametrically opposite sides of the cap, the diameter of the cap which intersects them being parallel to the link 11. The stops 9 are of such height or thickness that when the bolster is centered and hence when the spring 3 is in vertical position neither stop 20 is in contact with the plate 19.

The operation will now be described. When the bolster 1 is centered, its weight is carried by the springs 3 at each end thereof, each spring being supported by its spring cap 9 which, in turn, transmits the weight through the rocker 8 to the rocker seat 7 and onto the main frame member 2. No pressure is imposed on the friction elements 6, 10, 19, regardless of whether the springs 3 are under light or heavy loading by the bolster 1.

Now suppose that the bolster swings away from center thus tilting the spring 3, and, consequently, causing the spring cap 9 to rock or tilt. There will be a short movement of the bolster before a stop 20 contacts the plate 19. It will thereupon make contact with slight pressure, as indicated in full lines in Figure 4, and, thereafter, as the movement of the bolster continues to its position of maximum movement, as indicated by the dotted lines, Figure 4, the pressure of the stop 20 against the plate 19 will increase. Now, as the bolster swings, the link 11 will be pushed to the left thus pushing the plate 10. At the initial portion of the movement the plate 10 will move freely, then as the left stop 20 contacts the plate 19 pressure on the plates 19, 10 and 6 begins to build up and hence frictional resistance to movement of the plate 10 begins. Increasing pressure of the stop 20 on the plate 19 increases the friction proportionate to the increasing movement.

During relative movements of the frame 2 and bolster 1 the brackets 22 which arise from the frame 2 guide the bolster and act to transmit driving and retarding movements between the frame 2 and the car body carried by the bolster. Nonmetallic friction elements 23 are interposed between the bolster caps 4 and the brackets 22.

Now suppose that the loading on the bolster increases, for instance, by a greater number of passengers entering the body supported thereby. When the bolster is centered there will still be no pressure on the friction plates 19, 10 and 6 until tilting of the spring cap 9 occurs but as the bolster swings and tilting does occur a proportionate part of the increased weight on the bolster will cause proportionately increasing pressure between the left stop and the plate 19. The proportionate increase in the pressure on the friction plates occasioned by increasing swinging movements of a lightly loaded bolster is thus increased proportionate to the increase in body load of a loaded bolster. Expressed mathematically the friction of the plates depends upon the product of the vertical deflection of the spring related to the mass imposed thereon and the lateral movement of the bolster for a given set of friction elements and for a given spring. The co-efficient of friction of the materials of which the plates 19, 10 and 6 are made must be taken into account. Also, the material and type of spring must be taken into account since, for example, if the coil spring 3 is replaced by a rubber spring the lateral displacement of the bolster under a given force might be different and this would change the component of the weight which causes the spring cap 9 to tilt. The mathematical expression of the frictional resistance, above stated, should therefore incorporate a factor representing the spring rate under vertical and lateral loading and a factor representing the co-efficient of friction between the friction surfaces.

Figure 5 shows the action of the spring assembly and friction device when the bolster swings to the right. The action is exactly the same as when it swings to the left except that the link 11 is under tension instead of under compression. If the link, in either instance, is being subjected to loading and an additional shock is imposed, as by a track irregularity, the rubber element 14 damps the impact.

While the drawings and description indicate that the friction device is applied to one end only of the bolster, it is contemplated that the structure illustrated may be duplicated at the other end of the bolster, if desired.

Various modifications may be made without departing from the spirit of the invention and I therefore, desire to be extended protection as defined by the scope of the appended claims.

What I claim is:

1. In a motion damping device for two main members movable vertically and laterally with respect to each other, a spring separating said members and resistant to all relative movements therebetween, a friction device having at least two friction elements, one of which is attached to one of said members and the other to the other of said members, said friction elements being in contact without pressure when said main members are in normal static position with respect to each other and also when said members move relatively laterally through predetermined slight distances out of normal static position, and a rocking lever supported by one of said members and acting as a seat for said spring, said lever being rockable against one of said friction elements in response to relative lateral movements of said members in excess of said slight distance to impose pressure between said elements, and a link connecting one of said elements with the other of said members for movement thereof with respect to the other of said elements.

2. In a friction device for snubbing relative movements of two members, said members being separated by springs and adapted to move in either of two directions laterally from a normal centered position, a friction pack composed of two relatively laterally stationary friction elements having a movable friction element therebetween carried by one of said members, a rocking lever also supported by said one member and having a seat for one of said springs opposite its point of rocking, said lever being subject to tilting action against one of said relatively stationary elements in response to relative movement of said members against the resistance of said springs in either direction away from centered position, said members being capable of a determinate movement away from centered position while initiating rocking movement of said rocking lever prior to contact of said lever with said one friction element, said rocker lever after contact with said element increasing the pressure imposed thereon in the direction of the other element in proportion to the extent of movement of said members, and a link connecting said movable element with the other of said members for movement thereof in accordance with the relative movement of said members.

3. In a friction device for snubbing relative movements of two members, said members being separated by springs and adapted to move in either of two directions laterally from a normal centered position, a friction pack composed of two relatively laterally stationary friction elements having a movable friction element therebetween carried by one of said members, a rocking lever also supported by said one member and having a seat for one of said springs opposite its point of rocking, said lever being subject to tilting action against one of said relatively stationary elements in response to relative movement of said members against the resistance of said springs in either direction away from centered position, said members being capable of a determinate movement away from centered position while initiating rocking movement of said rocking lever prior to contact of said lever with said one friction elements, said rocker lever after contact with said element increasing the pressure imposed thereon in the direction of the other element in proportion to the extent of movement of said members, and a link connecting said movable element with the other of said members for movement thereof in accordance with the relative movement of said members, said members also being movable relative to each other vertically in response to changed loading, said rocking lever being tilted with greater force when the load on said spring seat becomes greater thereby increasing the pressure imposed on said elements during lateral movements in proportion to an increase in such vertical loading.

4. In combination, two members separated by springs and adapted to move relative to each other both vertically and laterally, and a friction device comprising two relatively laterally stationary friction elements and a movable friction element in surface contact with said stationary elements, said two stationary elements being attached to one of said members, said movable element being attached through a linkage to the other of said members for movement therewith, a rocking lever carried by the first named member pivotally mounted to rock in and out of contact with one of said stationary friction elements in applying pressure to the contact of said elements, one of said springs being seated on said rocking element at one end and carrying a portion of the weight between said members, said rocking member being caused by its spring to rock in response to relative lateral movement of said members thereby imposing pressure between said elements in proportion to the extent of said relative lateral movement, said rocker member also increasing its pressure on said elements during relative lateral movements thereof in response to increasing vertical movement of said members, said friction elements thereby resisting relative lateral movements of said members according to the product of the lateral displacement of said members and the vertical displacement of the weight supported by said springs.

5. In combination in a rail truck, a main frame, a bolster supported by a spring at each end thereof from said frame, a spring cap for one end of at least one of said springs having a supporting rocker exteriorly thereof, a rocker seat arising from said frame for receiving said rocker, two friction element seach having an opening therethrough through which the shank of said rocker seat extends, said shank retaining the top one of said elements against lateral displacement with respect to said frame, the other of said elements having an opening therethrough substantially larger than said shank whereby it may slide against said top element, a link connecting said other element with a point on said bolster for sliding movement thereof in response to lateral movements of said bolster, the spring seated in said spring cap rocking in response to lateral motions of said bolster thereby causing said spring cap to rock into contact with the top one of said elements, said cap during such rocking movements imposing a pressure on said top element measured by the product of the lateral displacement of said bolster and the vertical displacement of the springs supporting said bolster.

References Cited in the file of this patent
UNITED STATES PATENTS

| | | |
|---|---|---|
| 872,014 | Price | Nov. 26, 1907 |
| 2,237,382 | Woodling | Apr. 8, 1941 |
| 2,483,185 | Crabtree | Sept. 27, 1949 |
| 2,562,595 | Blue | July 31, 1951 |
| 2,590,033 | Piron | Mar. 18, 1952 |